June 4, 1963 W. W. PEARCE 3,092,827
DISTRESS SIGNAL
Filed June 27, 1960
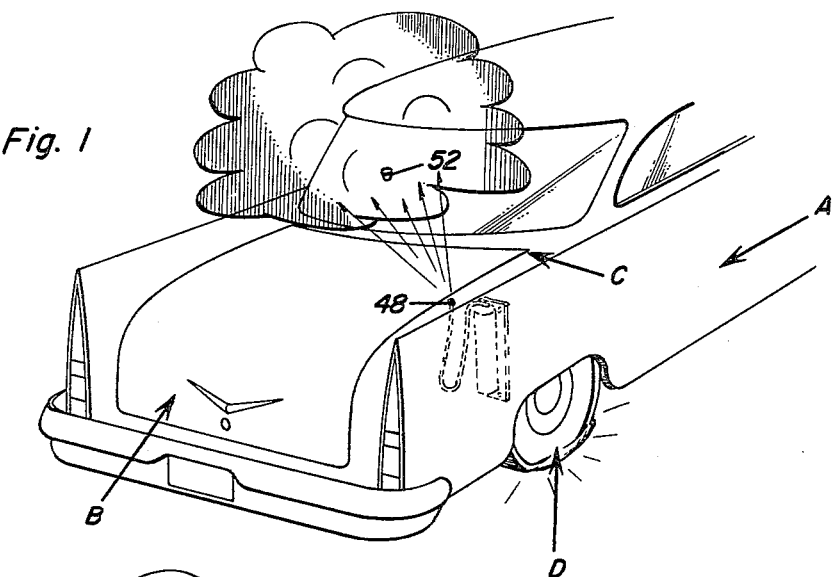
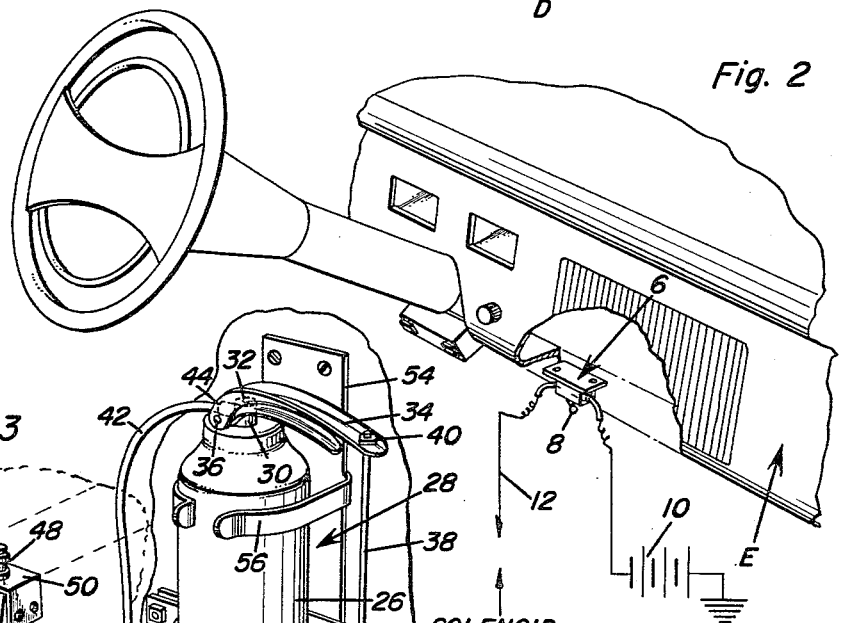
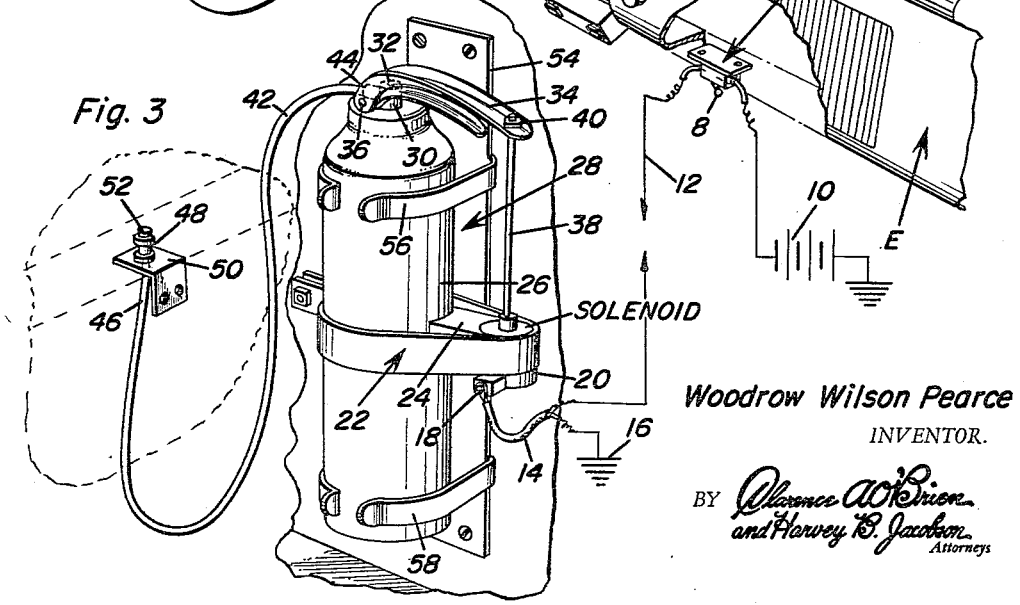
Woodrow Wilson Pearce
INVENTOR.

United States Patent Office 3,092,827
Patented June 4, 1963

3,092,827
DISTRESS SIGNAL
Woodrow Wilson Pearce, 1923 Foothill Drive,
Glendale 1, Calif.
Filed June 27, 1960, Ser. No. 38,816
5 Claims. (Cl. 340—366)

The present invention relates to a distress indicating and warning signal for practical use on an automobile or an equivalent vehicle.

Whether a highway driving emergency is encountered at night or day a visual warning signal is more reliable and preferable to an audible signal. Whereas various types of distress signals have been advocated for adoption and use the instant invention is believed to be an advance in the art in that it is characterized by a container which is charged with a pressurized dry chemical which may be activated and relied upon to release a cloud of red dust or smoke thus giving a warning to nearby drivers of other cars (going or coming) with the result that safer driving on the highway may be thus promoted.

In carrying out a preferred embodiment of the invention the component parts utilized in doing so unitedly and cooperatively function in a novel and improved manner. To this end a solenoid is strapped or otherwise mounted on a container of dry chemical. The chemical, when activated and allowed to discharge through a pressure-opened valve, serves to give off the aforementioned distress indicating traffic warning smoke-like signal. The container with the attached solenoid is removably clipped or otherwise mounted on a panel and is provided with a depressible valve which is normally closed but properly set and capable of opening under the action of a mechanically triggered lever brought into operation by a solenoid actuated rod.

Further novelty is predicated on the construction stated wherein the solenoid is energized by a toggle switch suitably mounted on the automobile instrument panel. Further, a dust or smoke conducting hose is communicatively connected with the container valve and has a discharge end connected with a bracket providing a discharge orifice and said orifice being closed by a stopper, said stopper being forcibly blown out of the orifice in a manner to open the orifice by the automatically applicable pressure of the pressurized chemical powder.

These together with other objects and advantages which will become subsequently apparent reside in the details of construction and operation as more fully hereinafter described and claimed, reference being had to the accompanying drawings forming a part hereof, wherein like numerals refere to like parts throughout, and in which:

FIG. 1 is a view in perspective showing a rear end portion of an automobile with a flat tire and with the orifice in the deck open and the colored distress smoke or dust issuing therefrom to provide the desired distress signal.

FIG. 2 is a view in perspective showing the instrument panel, that is, a fragmentary portion thereof and further showing the toggle switch located in an accessible easy-to-operate position.

FIG. 3 is a view in perspective which illustrates all of the essential, in fact, the primary components of the novel and improved distress signal.

In FIG. 1 the automobile or equivalent vehicle is denoted by the letter A, the trunk lid at B and the deck at C. The flat tire is denoted at D. The instrument panel (FIG. 2) is denoted at E and it is of any conventional type except that here it is provided at a place of vantage with an easily accessible toggle switch generally denoted by the numeral 6. The switch lever is denoted by the numeral 8, the switch being connected to the battery at 10 and the wire from the other side being denoted at 12.

This wire is joined with the conductor 14 which is suitably grounded at 16 and operatively mounted on a suitable terminal 18 carried by a solenoid 20. The solenoid is held in place by a clamping strap 22 and a spacing block or the like 24. These components are associated with the median portion 26 of a pressurized type container 28. As already mentioned, this container is loaded or charged with an appropriate dry chemical which when activated gives off a red colored smoke or warning dust. The discharge means for the dust is denoted generally at 30 and includes a normally closed mechanically openable dust release valve 32. The trigger to bring about the release action is a simple suitably shaped lever 34 having a forked end pivotally mounted in place on the container at 36. The trip lever 34 has to be pulled down against the valve to open said valve. The pull-down actuating rod is denoted at 38 and is adjustably connected at an upper end as at 40 to a cooperating end of the lever, the other or lower end of said rod constituting a component part of the solenoid and being operable by the solenoid when the latter is energized. It will be further noted that a suitable hose 42 is provided and one end thereof is communicatively joined as at 44 with the valved discharge means atop the container. The other end of the hose as at 46 is suitably connected to a "smoke" discharge fitting 48 on an L-shaped clip or bracket 50 which is mounted on the deck C so that proper alignment with the discharge opening is had. The bore of this fitting is closed by a pressure responsive cork or plug 52. Normally the plug 52 is in place and obviously nothing happens until the switch 6 is turned on. With the switch on (having had an unexpected flat tire) the solenoid is energized and actuates the pull-down rod or link 38 which pivots the trigger or lever 34. This lever, in turn, pushes down on and opens the valve 32 to allow the red smoke or dust to issue forcibly through the connection 44, the hose line 42 and by way of the discharge end 46 and discharge fitting or adapter 48. The released pressure blows the stopper out, as shown diagrammatically in FIG. 1. When the current is off the parts return to normal position and the valve on the container is closed.

In practice it has been found desirable to provide a supporting panel 54 suitably mounted in placed and provided with spring clips 56 and 58 which embrace and removably support the container.

The chemical used in the container may be such that it has the dual function of providing not only a warning or distress signal dust but also a fire extinguishing product. Thus, a single properly charged pressurized container might therefore be used as a warning signal and also as a fire extinguisher. Obviously, this multi-purpose aspect of the concept contributes to its over-all effectiveness. It follows that the invention serves the purposes for which it is intended and should meet not only with the needs of users but should comply with manufacturing economies and other manufacturing advantages.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. For emergency use on an in-traffic disabled automobile, a distress indicating and traffic warning signal comprising, in combination, a container having a discharge neck embodying a normally closed mechanically openable end valve, said container charged with a dry chemical which when pressurized and discharged by way of the neck forcibly expels a cloud of vividly colored distress indicating and warning dust, a lever pivotally mounted on said container and having a portion thereof engageable with and serving to actuate the valve to assume an open position when operated, a solenoid mounted on but exteriorly of said container and having a complemental member operatively connected with and for pivoting and operating said lever, a hose communicatively connected to said neck, a toggle switch for remote control use adapted to be mounted on an instrument panel on the aforementioned automobile, means electrically connecting the switch to said solenoid, supporting and mounting means for said container adapted to be attached to a fixed normaly concealed part of the automobile, a dust discharge adapter which is designed and adapted to be mounted on one of the rear fenders of the automobile underneath the fender and in alignment with an orifice provided therefor in the fender, said adapter being connected operatively with the discharge end of said hose, and a pressure responsive closure normally closing said adapter and automatically dislodged in a manner to open the adapter when a predetermined degree of pressure is applied thereto.

2. The structure defined in claim 1 and, in combination, a bracket adapted to be mounted on a part of the automobile adjacent to said container, said adapter being operatively mounted on and carried by said bracket.

3. In a distress signal for use on an automobile, in combination, a pressurized dry chemical dispenser comprising a container charged with a ready-to-use dry chemical under constant pressure, the upper end of said container having a discharge neck provided with a normally closed valve, a chemical delivery hose communicatively connected at its intake end to said neck, support means removably mounting said container on a relatively stationary support surface, a valve opening trip lever having one end pivotally mounted on the container adjacent the discharge neck, a median portion of said lever being engageable with the closed valve for purposes of depressing and opening the valve when the lever is depressed, a solenoid, means for energizing said solenoid and means mounting said solenoid on a median portion of said container, a rod paralleling the container and having an upper end operatively connected with an adjacent free end of the lever, the lower end of said rod being cooperable with and constituting a component part of the solenoid and being operable when the solenoid is either energized or deenergized as the case may be.

4. The structure defined in claim 3 and wherein said support means comprises a panel, said panel being provided on a face thereof with readily accessible container embracing and supporting spring clips, said container being supported against the panel and removably embraced by and held on the panel by said spring clips.

5. In combination, an automobile having, among other component parts, a conventional type body including a trunk at the rear with a lid for the trunk rendering the space of the trunk accessible, and an instrument panel on its interior at the front permitting access to be had thereto by the driver, a support panel fixed vertically on a stationary part within the confines of said trunk, said panel provided with upper and lower accessible container embracing and supporting clips, a container embraced by said clips and charged with ready-to-use dry chemical under constant pressure, the upper end of said container having a discharge neck provided with a normally closed dispensing valve, a chemical delivery hose communicatively connected at its intake end to said neck, a valve depressing and opening trip-lever having one end pivotally mounted on the upper end of the container adjacent said discharge neck, a median portion of said lever being engageable with the valve in a manner to depress and open the valve whenever necessary or desired, a solenoid separate from said container and exterior thereof, means adjustably and detachably mounting said solenoid on one side of a median portion of said container, a lever operating rod, said rod being parallel to said container and having an upper end operatively connected with a free end of the lever, the lower end of said rod being operatively cooperable with and constituting a component part of the solenoid and being operable when the solenoid is either energized or deenergized as the case may be, the aforementioned trunk being provided with rear fenders, one of said fenders being provided with a discharge opening, a bracket mounted on an interior underneath part of said fender, said bracket being provided with a hose-end adapter, said adapter being in alignment with said discharge opening, and a hose having an intake end connected with said neck, a discharge end communicatively connected with said adapter, and a manually actuatable occupant-controlled signal operating switch mounted on the aforementioned instrument panel and electrically connected with said solenoid.

References Cited in the file of this patent

UNITED STATES PATENTS

| Re. 24,631 | Campanell | Apr. 14, 1959 |
| 2,257,168 | Hammond | Sept. 30, 1941 |
| 2,346,325 | Oliver | Apr. 11, 1944 |
| 2,891,140 | Huff | June 16, 1959 |
| 2,917,736 | Marotta | Dec. 15, 1959 |